US011804023B1

(12) United States Patent
Deuskar

(10) Patent No.: US 11,804,023 B1
(45) Date of Patent: Oct. 31, 2023

(54) SYSTEMS AND METHODS FOR PROVIDING A VIRTUAL DRESSING ROOM AND A VIRTUAL STYLIST

(71) Applicant: Stylitics, Inc., New York, NY (US)

(72) Inventor: Rohan Deuskar, New York, NY (US)

(73) Assignee: Stylitics, Inc., New York, NY (US)

( * ) Notice: Subject to any disclaimer, the term of this patent is extended or adjusted under 35 U.S.C. 154(b) by 0 days.

(21) Appl. No.: 18/333,232

(22) Filed: Jun. 12, 2023

Related U.S. Application Data

(60) Provisional application No. 63/368,076, filed on Jul. 11, 2022.

(51) Int. Cl.
| | |
|---|---|
| *G06T 19/00* | (2011.01) |
| *G06T 19/20* | (2011.01) |
| *G06T 7/50* | (2017.01) |
| *G06T 7/62* | (2017.01) |
| *G06V 40/16* | (2022.01) |
| *G06V 10/764* | (2022.01) |

(52) U.S. Cl.
CPC ............ *G06T 19/20* (2013.01); *G06T 7/50* (2017.01); *G06T 7/62* (2017.01); *G06V 10/764* (2022.01); *G06V 40/171* (2022.01); *G06V 40/172* (2022.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 9,460,557 | B1* | 10/2016 | Tran | G06T 15/205 |
| 9,996,981 | B1* | 6/2018 | Tran | A43B 3/34 |
| 10,467,526 | B1* | 11/2019 | Appalaraju | G06V 10/774 |
| 10,732,261 | B1* | 8/2020 | Wang | G01S 7/417 |
| 11,574,421 | B2* | 2/2023 | Koh | G06T 7/97 |
| 2003/0123026 | A1* | 7/2003 | Abitbol | G06Q 30/0641 |
| | | | | 351/204 |
| 2008/0163344 | A1* | 7/2008 | Yang | G06Q 30/0201 |
| | | | | 705/7.29 |
| 2009/0051683 | A1* | 2/2009 | Goonetilleke | A43D 1/025 |
| | | | | 348/207.1 |
| 2009/0208113 | A1* | 8/2009 | Bar | A43D 1/022 |
| | | | | 600/592 |
| 2012/0013630 | A1* | 1/2012 | Rutschmann | G06T 11/60 |
| | | | | 345/593 |

(Continued)

*Primary Examiner* — Martin Mushambo
(74) *Attorney, Agent, or Firm* — Ansari Katiraei LLP; Arman Katiraei; Sadiq Ansari

(57) ABSTRACT

Disclosed is a virtual dressing room that allows a user to virtually try on clothing, clothing accessories, and/or other related items on a model of the user's own body, and a virtual stylist that automatically selects and curates items to match, accentuate, and/or otherwise complement the body type, physical features, look, and/or style of the user. The virtual stylist may receive images of the user over a data network, may determine attributes of the user by analyzing the images, may input the user attributes into a relationship model, and may receive item preferences as output from the relationship model. The virtual stylist may select a set of items from a plurality of items based on the set of items comprising tags that satisfy the item preferences, and may generate and present generate a site with the selected set of items.

20 Claims, 10 Drawing Sheets

(56) References Cited

U.S. PATENT DOCUMENTS

| | | | |
|---|---|---|---|
| 2013/0124156 A1* | 5/2013 | Wolper | G06T 17/00 703/1 |
| 2013/0215116 A1* | 8/2013 | Siddique | G06Q 20/40 705/26.7 |
| 2013/0307851 A1* | 11/2013 | Hernandez Stark | G06T 17/00 345/420 |
| 2015/0003690 A1* | 1/2015 | Masuko | G06T 11/60 382/111 |
| 2015/0058169 A1* | 2/2015 | Arayama | G06Q 30/0623 705/26.61 |
| 2015/0199816 A1* | 7/2015 | Freeman | G06T 7/74 382/103 |
| 2016/0286906 A1* | 10/2016 | Malal | A43B 17/00 |
| 2017/0053335 A1* | 2/2017 | Hanscom | A43D 1/027 |
| 2017/0168586 A1* | 6/2017 | Sinha | G06V 40/11 |
| 2017/0243085 A1* | 8/2017 | Vanhoucke | G06V 10/454 |
| 2017/0249783 A1* | 8/2017 | Mach Shepherd | G06T 17/20 |
| 2017/0272728 A1* | 9/2017 | Rafii | G06Q 30/0631 |
| 2018/0033202 A1* | 2/2018 | Lam | G06V 40/10 |
| 2018/0247426 A1* | 8/2018 | Gluck | G06Q 30/0643 |
| 2018/0300791 A1* | 10/2018 | Ganesan | G06Q 30/0601 |
| 2019/0180176 A1* | 6/2019 | Yudanov | G06N 3/045 |
| 2019/0220685 A1* | 7/2019 | Uchiyama | G06V 40/10 |
| 2019/0274395 A1* | 9/2019 | Stesin | A61B 5/1073 |
| 2020/0065991 A1* | 2/2020 | Chu | G06T 7/33 |
| 2020/0134694 A1* | 4/2020 | Park | G06Q 30/0631 |
| 2020/0175334 A1* | 6/2020 | Zhang | G06F 18/217 |
| 2020/0275742 A1* | 9/2020 | Kim | A43D 1/025 |
| 2020/0334736 A1* | 10/2020 | Crabtree | G06F 16/9535 |
| 2020/0364935 A1* | 11/2020 | Revkov | A43D 1/025 |
| 2021/0125405 A1* | 4/2021 | Tran | A61B 5/0205 |
| 2021/0267315 A1* | 9/2021 | Ichikawa | A43D 1/06 |
| 2021/0295114 A1* | 9/2021 | Ye | G06F 16/5846 |
| 2022/0044439 A1* | 2/2022 | Hou | G06T 7/75 |
| 2022/0230420 A1* | 7/2022 | Cheng | G06V 10/7715 |

* cited by examiner

SYSTEMS AND METHODS FOR PROVIDING A VIRTUAL DRESSING ROOM AND A VIRTUAL STYLIST

CLAIM OF BENEFIT TO RELATED APPLICATIONS

This application claims the benefit of U.S. provisional application 63/368,076 entitled "Systems and Methods for Providing a Virtual Dressing Room and a Virtual Stylist", filed Jul. 11, 2022.

BACKGROUND

Online shopping is challenging traditional retail stores and in-person shopping in many areas. However, shoppers may prefer purchasing clothing and clothing accessories from a traditional retail store where they can try on the items to see how the items fit on the shopper's body and/or to allow the shopper to see how the items conform to the shopper's personal style, preferences, and/or other owned items.

DETAILED DESCRIPTION OF PREFERRED EMBODIMENTS

The following detailed description refers to the accompanying drawings. The same reference numbers in different drawings may identify the same or similar elements.

Systems and methods, in accordance with the embodiments set forth herein, may provide a virtual dressing room that allows a user to virtually try on clothing, clothing accessories, and/or other related items on a three-dimensional ("3D") model of the user's own body. The systems and methods may further provide a virtual stylist that automatically selects and curates items based on physical attributes of the user that are extracted when constructing the 3D model and/or from analyzing images of the user. The virtual dressing room and the virtual stylist are provided to improve the graphical user interface ("GUI") and online shopping experience for clothing, clothing accessories, and/or other related items.

In some embodiments, the virtual dressing room may generate the virtual user model to match the size and shape of the person's body, and may apply item models representing the size and shape of selected items onto the virtual user model. In this manner, the virtual dressing room may accurately present the fit and style of each item in relation to the individual's body as if the user was physically wearing the item on their own body. The virtual dressing room may also allow the individual to rapidly swap and compare different clothing and clothing accessories on their virtual user model to more easily and quickly generate outfits or groupings of clothing items that satisfy the individual's personal style, preferences, body type, and/or other owned clothing items. In other words, the virtual dressing room allows a user to virtual try on different items and to mix-and-match the items in order to find a set of items that form an outfit with a desired fit and style relative to the modeled replica of the users body. This is done without the user having to navigate to different locations within a physical store where the different items for the outfit may be located (e.g., clothing tops, clothing bottoms, pants, shirts, shoes, etc.) and without having to physically try on each and every possible combination in an actual dressing room to find the desired outfit.

The virtual stylist may analyze body type, physical features, look, and/or style of each user in order to automatically select different items for each user to virtually try on in the virtual dressing room. Specifically, the virtual stylize may use artificial intelligence and/or machine learning ("AI/ML") techniques to identify the items that match, accentuate, and/or otherwise complement the analyzed body type, physical features, look, and/or style of the individual.

Figure 1:
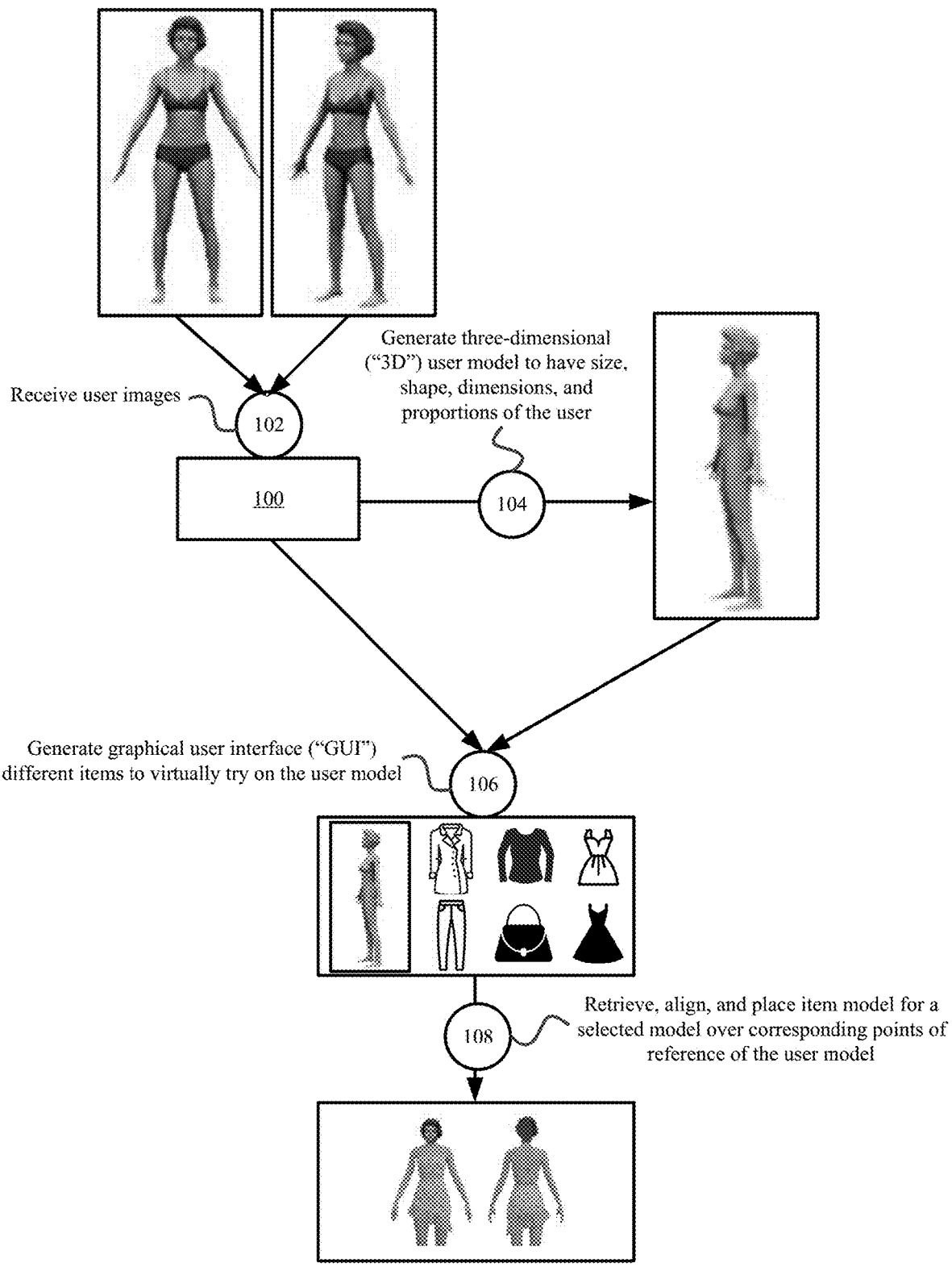
FIG. 1 illustrates example operation of the virtual dressing room and the virtual stylist in accordance with some embodiment presented herein.

FIG. 1 illustrates example operation of the virtual dressing room and the virtual stylist in accordance with some embodiment presented herein. A user may upload (at 102) one or more images of themselves to virtual dressing room system ("VDRS") 100.

VDRS 100 may analyze the images to create (at 104) a digital model or representation of the user based on the images. In some embodiments, VDRS 100 may generate (at 104) a three-dimensional ("3D") model to have a size, shape, dimensions, and/or proportions that matches the actual size, shape, dimensions, and/or proportions of the user's body.

VDRS 100 may generate (at 106) a GUI that presents the model and various clothing items that may be applied to the model. The user may select one or more of the clothing items to virtually try on. In response to an item selection, VDRS 100 may retrieve an item model for the selected item, may align the item model to corresponding points of reference about the user model, and may place or wrap the item model over the user model over the aligned points of reference to present (at 108) the fit and/or style of the selected item relative to the user's body.

In some embodiments, the user model may be defined with a first set of measurements, dimensions, and/or proportions, and each clothing item may be defined with a second set of measurements, dimensions, and/or proportions. VDRS 100 may use the measurements, dimensions, and/or proportions to generate an accurate visualization within the GUI for the proportionality, fit, and/or appearance of the individual clothing items on the user model. In some embodiments, VDRS 100 may wrap a 3D model with exact proportions and/or dimensions of a particular item over a 3D model with accurate proportions and/or dimensions of the user's body to demonstrate how the particular item would rest on the user's body, how big or small the particular item is relative to the user's body, how tight or loose the particular item would appear on the user's body, and/or how the particular item would appear with other items on the user's body.

VDRS 100, by operation of the virtual stylist, may analyze the body type, physical features, look, and/or style of the user based on the provided images, and may automatically filter the available clothing items to retain a subset of items that match, accentuate, and/or otherwise complement the user's body type, physical features, look, and/or style. Moreover, VDRS 100 may generate outfits that include groupings of different clothing items for different parts of the body or for different uses (e.g., jackets with shirts or pants with socks), and may automatically update the GUI to present the generated outfits over the generated user model. The user may interact with the virtual dressing room function of VDRS 100 to swap out individual items and customize the look relative to user model that provides an accurate representation of the user's body, size, shape, proportions, and/or appearance. VDRS 100 may provide options with which the user may purchase one or more of the items after virtually visualizing the look, fit, and style of the items on the custom user model of that user's body without having physically tried on any of the clothing items.

Figure 2:
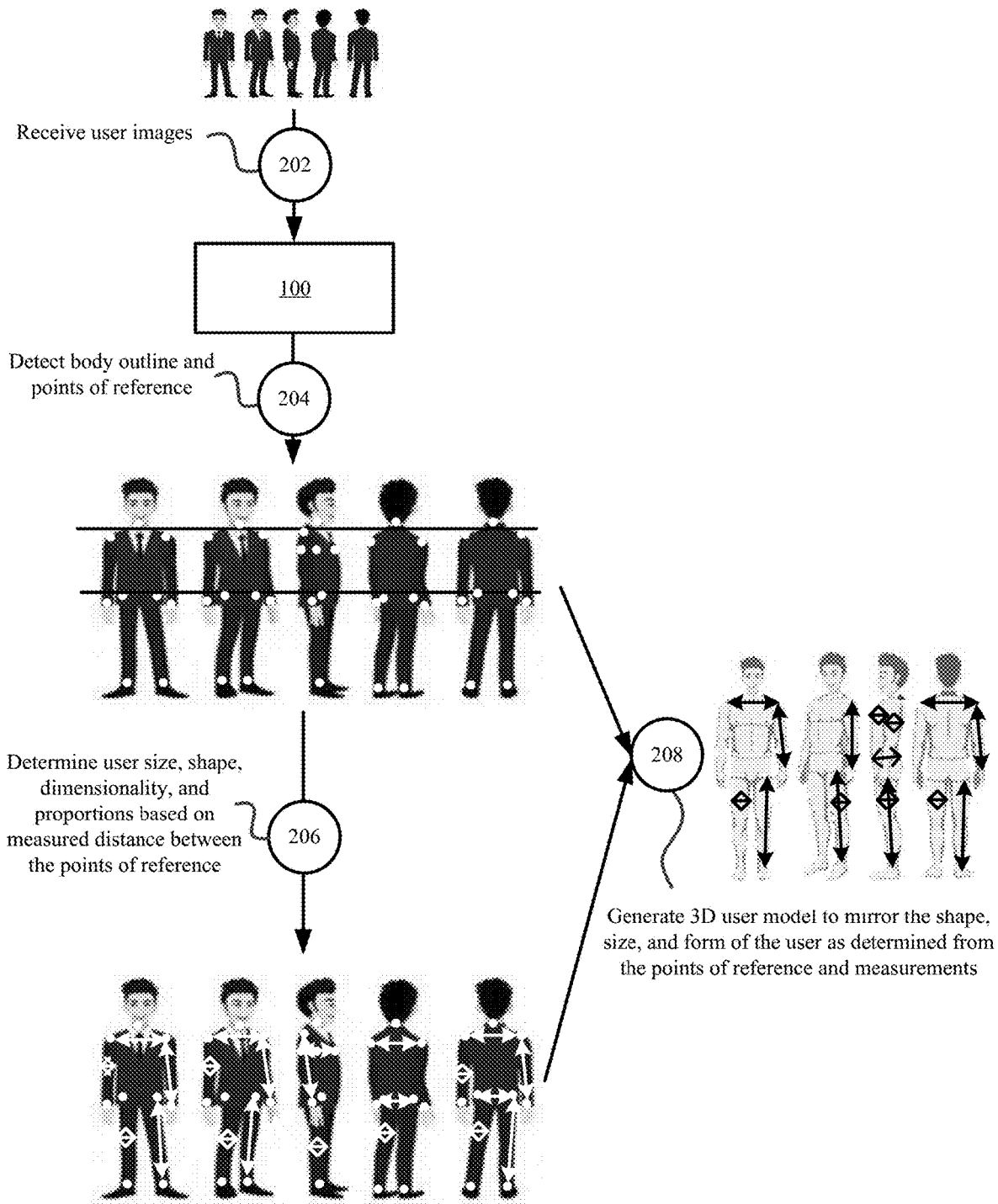
FIG. 2 illustrates an example of generating a user model in accordance with some embodiments presented herein.

FIG. 2 illustrates an example of generating a user model in accordance with some embodiments presented herein. The user may upload (at 202) one or more body images to VDRS 100. VDRS 100 may determine and/or compute the size, dimensionality, and/or proportionality of the body based on the provided images. For instance, full body images from the front, side(s), and/or back of the user's body may be sufficient for VDRS 100 to generate a complete 3D model that is proportional to the actual user's body. In some embodiments, a single image may be sufficient to determine the size, shape, dimensions, and/or proportions for the parts of the body appearing in that single image. The user may be clothed in the provided images, and VDRS 100 may adjust the size and shape of the user model to account for the layers of clothing over the body. In some embodiments, the user may upload a video of their body, and VDRS 100 may extract the one or more images from the video or may generate the 3D model of the user's body directly from analyzing video.

To determine and/or compute the size, dimensionality, and/or proportionality of the body, VDRS 100 may analyze the uploaded images to detect (at 204) the outline of the user body and specific points of reference within the outline. For instance, VDRS 100 may detect (at 204) the position of the user's neckline, waistline, shoulders, hands, feet, and/or other points on the body that may be used to accurately measure the size, dimensions, and proportions of the user's body.

VDRS 100 may measure (at 206) the distance between the different points of reference in order to accurately map the size, shape, dimensionality, and/or proportions of the user body. For instance, VDRS 100 may measure (at 206) shoulder width, arm length, arm thickness, leg length, leg thickness, height, waistline, neck size, chest, and/or other physical attributes based on relative distances between the specific points of references detected (at 204) within the images. Moreover, VDRS 100 may compare the measurements that are obtained for the same body part in different images to verify the accuracy of the measurements and/or correct for any variation that may result from measuring the same body part from different views.

VDRS 100 may generate (at 208) a 3D user model that is proportionate to the user's body based on the detected points of reference, measurements, and/or other dimensions or proportions that are derived from the image analysis. Accordingly, VDRS 100 may generate (at 208) the 3D user model that mirrors the shape, size, and form of the user. In other words, VDRS 100 may map the user's body to a digitally created model or representation of the user's body in 3D space. In some embodiments, the 3D user model may be defined with a skeletal framework that is overlaid with meshes, textures, and/or other 3D constructs that mirror the muscle tone, size, and definition of the user.

In some embodiments, the user may input their measurements (e.g., height, weight, neck size, waist, etc.) and may specify their body type (e.g., slim, athletic, large, potbelly, regular, small hips, etc.) to select a less accurate user model of their person. In some other embodiments, VDRS 100 may present a set of predefined models for different body types, and the user may select the user model that is a closest match to their own body.

In some embodiments, the user model may be stored with a user account or user profile. Accordingly, VDRS 100 may generate the user model one time for a particular user, and VDRS 100 may retrieve and/or present that user model whenever the particular user accesses that user account or user profile at one or more online merchants.

Figure 3:
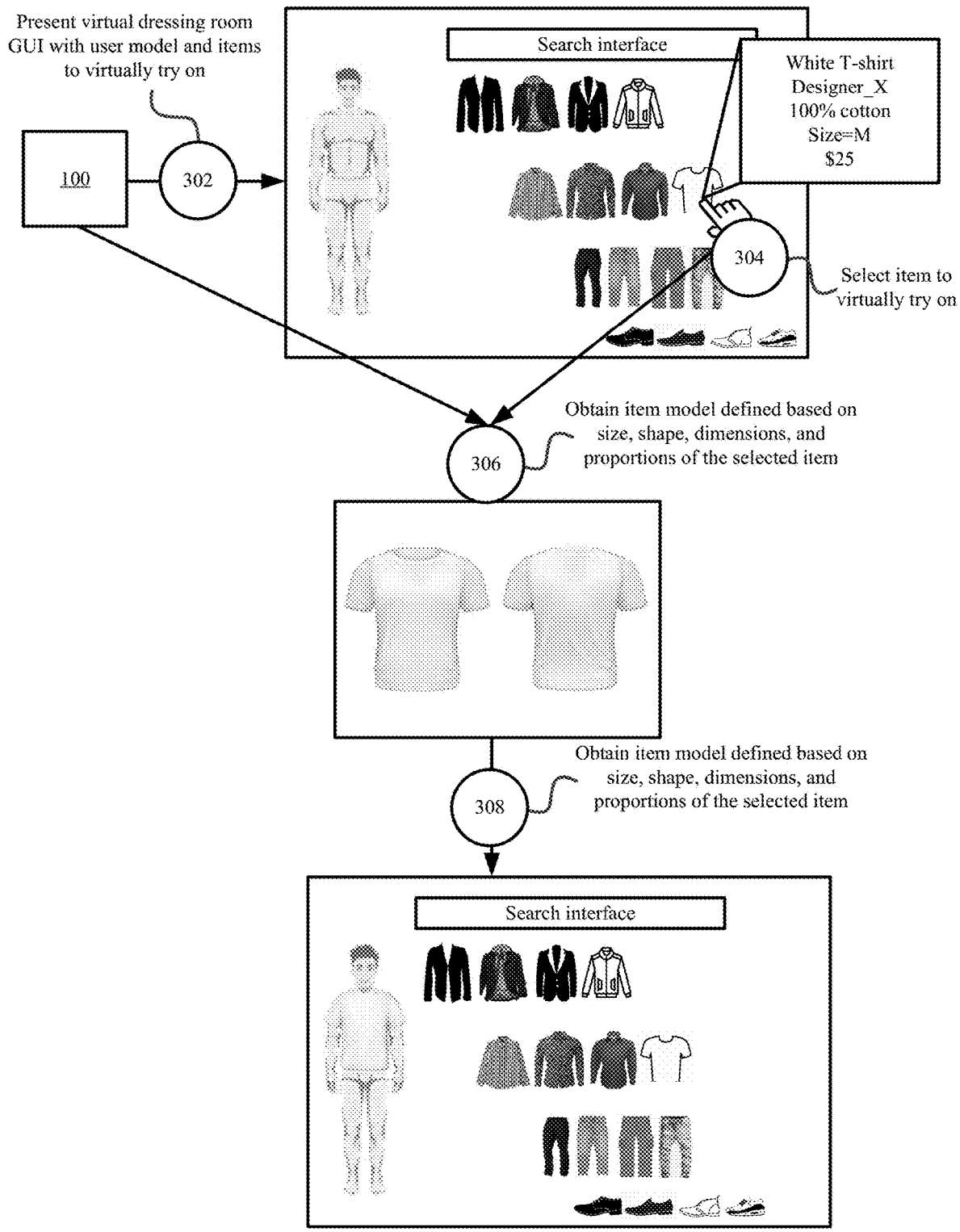
FIG. 3 illustrates an example of virtually trying on an item using virtual dressing room functionality in accordance with some embodiments presented herein.

FIG. 3 illustrates an example of virtually trying on an item using virtual dressing room functionality in accordance with some embodiments presented herein. VDRS 100 may present (at 302) a GUI with the user model that is generated based on the sizing, dimensions, and proportions of a particular user, and an interface from which the user may search, select, and virtually try on different clothing items and/or clothing accessories. The interface may present an image for each item and various identifying information about the item. The identifying information may include the designer, manufacturer, price, material composition, size, and/or other properties of the items. In some embodiments, the identifying information for an item may be presented when the user interacts with that item.

Each item and/or each image from the selection interface may be associated with a 3D model of that item. The 3D item model may be defined according to the size, dimensions, and/or proportions of the item. A single item may be associated with multiple models when that item is available in different sizes (e.g., small, medium, large, 32×32, size 4, etc.) and/or different fits (e.g., slim fit, regular fit, big and tall, wide leg, boot cut, low rise, etc.). In some embodiments, VDRS 100 may generate the item models based on two-dimensional ("2D") images of the items, relative dimensions and/or proportions that are derived from the 2D images, and/or other associated item information such as textual descriptions for the size, material composition, fit, and/or other properties of the item.

In response to a user selecting (at 304) a particular item in a particular size to virtually try on, VDRS 100 may obtain (at 306) the item model for that particular item in the particular size. In some embodiments, each item model may correspond to a 3D mesh, 3D texture, or other 3D construct, and may include its own points of reference to align with corresponding points of reference of the user model. VDRS 100 may apply (at 308) the item model onto the user model by aligning the corresponding points of reference.

As shown in FIG. 3, the obtained (at 306) item model for the selected shirt may include a neckline point of reference, and applying (at 308) the item model may include aligning the neckline point of reference from the item model with the corresponding neckline point of reference from the user model. Applying (at 308) the item model may further include wrapping the 3D mesh over the aligned parts of the 3D user model. More specifically, the item model may be applied (at 308) over the corresponding part of the user model while retaining the size, dimensionality, and/or proportionality of each model. Therefore, if the item model is for a shirt with a sleeve length of 36 inches and a neck size of 16 inches, and the user model has an arm length of 34 inches and a neck size of 15 inches, then VDRS 100 may update the GUI to illustrate the shirt sleeves extending past the user model's hands, and the collar of the shirt to be larger and separated from the neck of the user model. Similarly, if the dimensions of a selected item are too small relative to the dimensions of the user model, then VDRS 100 may present a notification in the GUI of the mismatched sizing, or if the item model is associated with an elastic or stretchable material, then VDRS 100 may apply the item model by stretching the item model over the user model at the corresponding positions.

Figure 4:
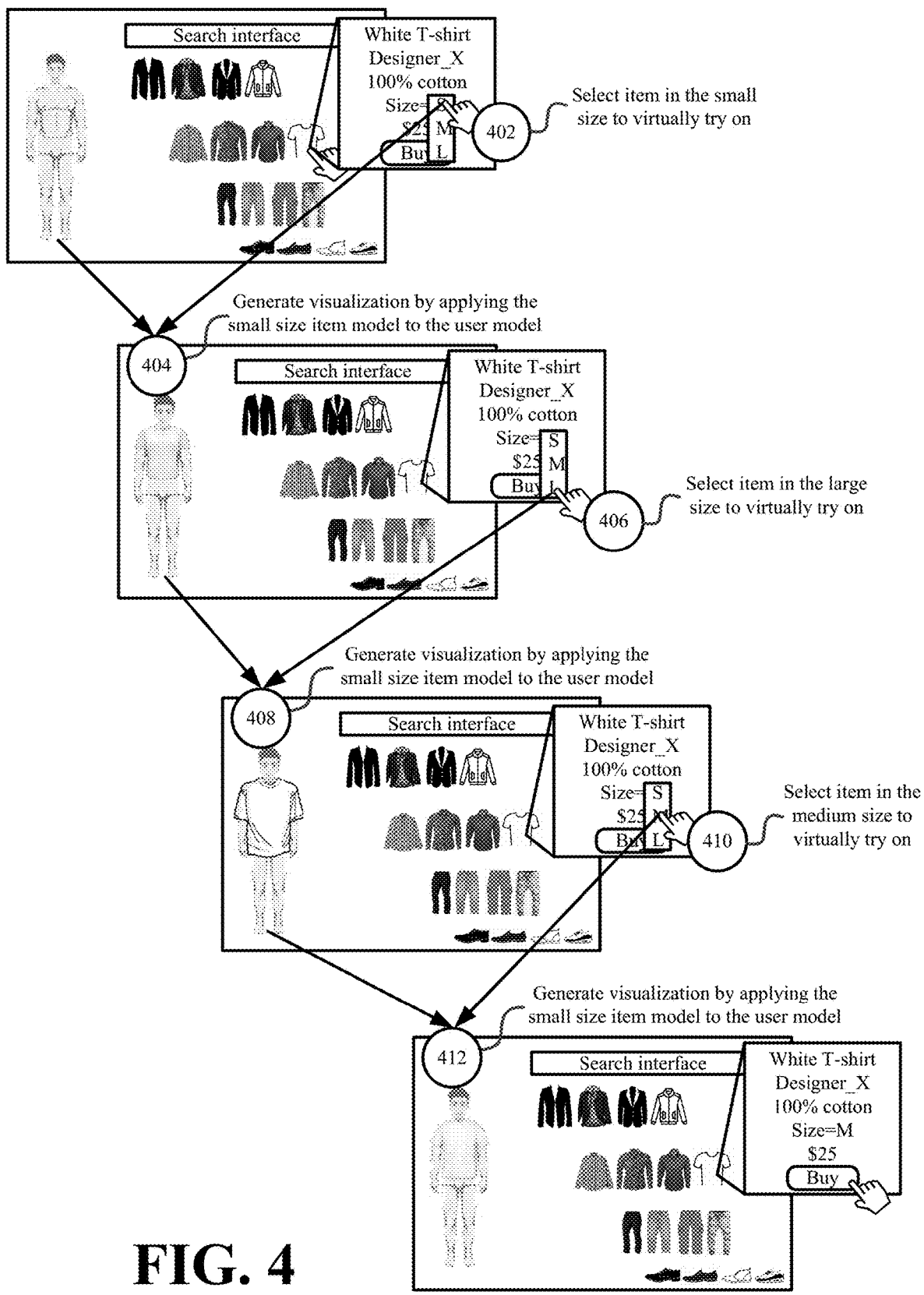
FIG. 4 illustrates an example of updating the virtual dressing room GUI to visualize the fit of a particular shirt in different sizes on the user model that is generated based on the body type, size, and shape of a particular user in accordance with some embodiments.

As the user selects different items, different sizes for a selected item, and/or different fits for the selected item from the selection interface, VDRS 100 may update the GUI to provide a visualization for how each selected item fits with respect to the virtual model of the user's body. FIG. 4 illustrates an example of updating the virtual dressing room GUI to visualize the fit of a particular shirt in different sizes on the user model that is generated based on the body type, size, and shape of a particular user in accordance with some embodiments.

As shown in FIG. 4, the particular user may select (at 402) the particular shirt in a small first size to virtually try on the user model that is generated based on the body type, size, shape, dimensions, and/or proportions of the particular user. VDRS 100 may update (at 404) the virtual dressing room GUI to present a visualization of the item model for the particular shirt in the small size applied to the user model. As can be seen, the particular shirt is too short and too tight on the body type of the particular user.

Accordingly, the particular user may select (at 406) the particular shirt in a large second size to virtually try on the user model. VDRS 100 may update (at 408) the virtual dressing room GUI based on the second selection. In particular, VDRS 100 may apply the item model for the particular shirt in the large second size onto the user model, and may present the resulting visualization. In this case, the particular shirt is shown to be too long, baggy, and large for the body type of the particular user.

The particular user may then select (at 410) the particular shirt in a medium third size to virtually try on the user model. VDRS 100 may update (at 412) the virtual dressing room GUI based on the third selection, and may present the updated visualization showing the item model for the particular shirt in the medium third size being applied onto the user model. The particular user may determine that the size, style, and fit of the medium sized shirt on the user model of the particular user's body is the look they desire, and may interact with the GUI to purchase and/or order the particular shirt in the medium size.

In a similar fashion, VDRS 100 allows the user to combine different clothing items for different body parts or uses in order to visualize the styling, fit, and interplay of the different items relative to the body type, size, and shape of the user's actual body. For instance, VDRS 100 may apply a first item model for pants onto the user model, and a second item model for a shirt onto the user model.

VDRS 100 may be configured with a set of rules that specify the layers of the item models. For instance, a rule may specify presenting a bottom part of the shirt over the pants if the item models for the two items intersect when applied to the user model. Similarly, VDRS 100 may be configured with a rule that specifies overlaying a jacket over a selected shirt.

The user may determine that, even though they like the pants and shirt individually and together, they do not like how the combination of pants and shirts fits and looks on or relative to the user's body. Accordingly, the user may select a different pair of pants, perhaps with a different cut, fit, or style, and VDRS 100 may update the GUI to apply the same shirt with the new pair of pants onto the user model. The user may determine that the collective styling of the shirt and the new pair of pants relative to each other and also relative to the user's body type, size, and shape is preferable to the previous outfit, and gives the user a desired style or look.

In this manner, VDRS 100 illustrates the collective styling of an outfit formed by different items as well as the collective styling of the outfit on the user model. The user is able to visualize not only the items next to each other, but how those items look in relation to the user's body as represented by the user model and the proportional layering of the item models over the user mode without the user physically trying on the items. Moreover, by swapping the items off and on the user model, the user is able to quickly visualize how different outfits looks on their body without having to search for the individual items in a physical store and then physically try on every combination in a store dressing room.

In some embodiments, the virtual dressing room may be adapted for use with AR devices. In some such embodiments, the placement of the items models over the user model may be replaced with the placement of the item models over a real-time and/or live image of the user. For instance, the AR device may be placed over the user's head and/or eyes while the user stands in front of a mirror. The AR device does not block the user's sight, but enhances or changes what the user sees. Specifically, the AR device coupled with VDRS 100 allows the user to see their reflection in the mirror with the user's reflection becoming the user model onto which the item models are presented. The same effect may be produced with a VR device that captures the user reflection from the mirror and that projects an overlay of the selected item models onto the user image in the VR device display.

Figure 5:
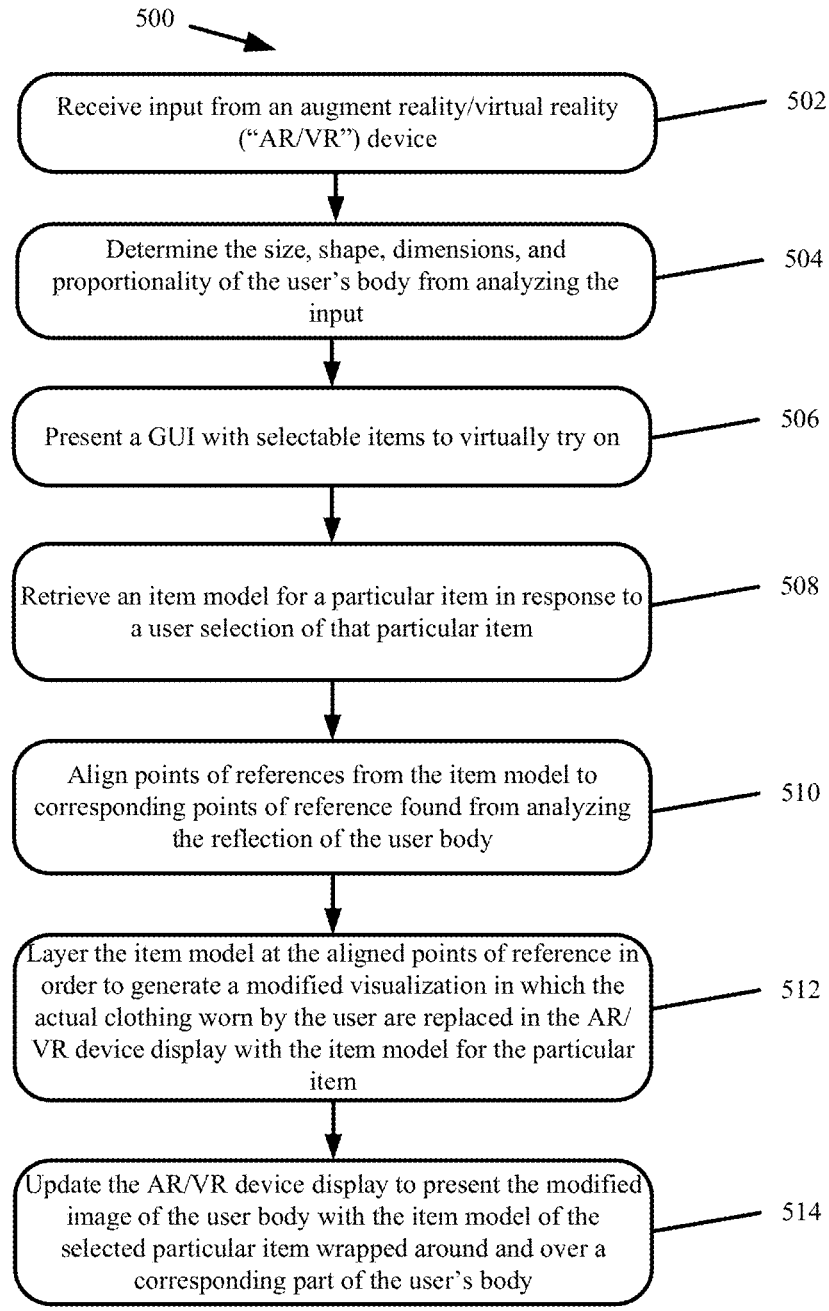
FIG. 5 presents a process for an augmented reality ("AR") enhanced implementation of the virtual dressing room in accordance with some embodiments.

FIG. 5 presents a process 500 for an AR enhanced implementation of the virtual dressing room in accordance with some embodiments. Process 500 may be implemented by VDRS 100 in conjunction with a user that accesses the virtual room functionality using a VR/AR device.

Process 500 may include receiving (at 502) input from an AR/VR device of a user. The input may include a video feed or live image capture of the reflection of the user's body in a mirror.

Process 500 may include determining (at 504) the size, shape, dimensions, and proportionality of the user's body from analyzing the input. Determining (at 504) the size, shape, dimensions, and proportionality may include identifying points of reference onto which different item models of different clothing items may be placed onto the image.

Process 500 may include presenting (at 506) a GUI with selectable and/or interactive elements for searching the available items, viewing information about the available items, virtually trying on one or more of the items, and/or purchasing or otherwise saving items. The user may interact with the GUI using touch inputs, gestures, controller input, voice commands, a keyboard, and/or other AR/VR input. The selectable and/or interactive elements may include icon representing different shirts, pants, shoes, outerwear, underwear, and/or other clothing items or clothing accessories.

Process 500 may include retrieving (at 508) an item model for a particular item in response to a user selection of that particular item. The selection may identify one of several sizes that the particular items comes in (e.g., 32×32, 34×34, size 2, size 4, small, medium, large, etc.), different cuts (e.g., slim fit, big and tall, loose fit, straight fit, boot cut, etc.), and/or other parameters for selecting between different variants of the particular item.

Process 500 may include aligning (at 510) one or more points of references from the item model to corresponding points of reference found from analyzing the reflection of the user body. For instance, if the item model is for a shirt and includes a neckline and sleeve points of reference, VDRS 100 may match those points of reference from the item model to the neckline and shoulder points of reference detected from analyzing the user reflection (e.g., user input from the AR device).

Process 500 may include layering (at 512) the item model at the aligned points of reference in order to generate a modified visualization in which the actual clothing worn by the user are replaced in the AR/VR display with the item model for the clothing item that the user selects to virtually try on. For instance, if the selected item is a first shirt and the user is already wearing a second shirt that appears in the reflection, VDRS 100 may control the AR device to block or obscure the second shirt, and to overlay and present the item model of the first shirt with accurate sizing, dimensionality, and proportionality relative to the user's body in the reflection. In other words, the user no longer sees their reflection in the mirror, but a modified image of the user's body with the item model of the first shirt replacing the actual second shirt worn by the user. In some embodiments, layering (at 512) the item model may include stretching, manipulating, and/or other expanding or contracting various parts of the item model to conform to the size, shape, contours, dimensions, and/or proportionality of the user body. In some embodiments, layering (at 512) the item model may include aligning the size, shape, and contours of the item model to the detected size, shape, and contours of the user's body.

Process 500 may include updating (at 514) the AR/VR device display to present the modified image of the user body with the item model of the selected particular item wrapped around and over a corresponding part of the user's body so that the user is able to visualize the appearance, style, fit, and/or visual characteristics of the particular item relative to the user's own body. In some embodiments, VDRS 100 may continually update (at 514) the AR/VR display to move and contort the item model to stay aligned with the reflection of the user body in the mirror. For instance, if the user turns around, VDRS 100 may present the back of the selected item overlaid onto the user's backside, or if the user raises his arms, VDRS 100 may contort the item model so that the sleeves raise and lower with the user's arms.

To assist the user in finding items of interest, VDRS 100 may provide a virtual stylist. The virtual stylist may perform image analysis to determine a user's body type, physical features, look, and/or style, and may automatically select items from a plurality of items that match, accentuate, and/or otherwise complement the user's body type, physical features, look, and/or style. VDRS 100 may apply the item models for the automatically selected items to the user model so that the user is able to visualize the fit and look of each item relative on their own body instead of visualizing the items as detached images without reference or context to the user's own body.

The virtual stylist may be based on a AI/ML modeling of items that are preferred by other users with similar body types, physical features, looks, and/or styles. For instance, the virtual stylist may determine that people with lighter skin tones and beards of a certain length commonly purchased or spent more browsing time on items with a first style classification tag or label, and people with darker skin tones and no facial hair commonly purchased or spent more browsing time on items with a second style classification tag or label. When VDRS 100 is accessed by a user that is determined to have a darker skin tone and no facial hair, the virtual stylist of VDRS 100 may select and present items with the second style classification tag or label to the user.

Figure 6:
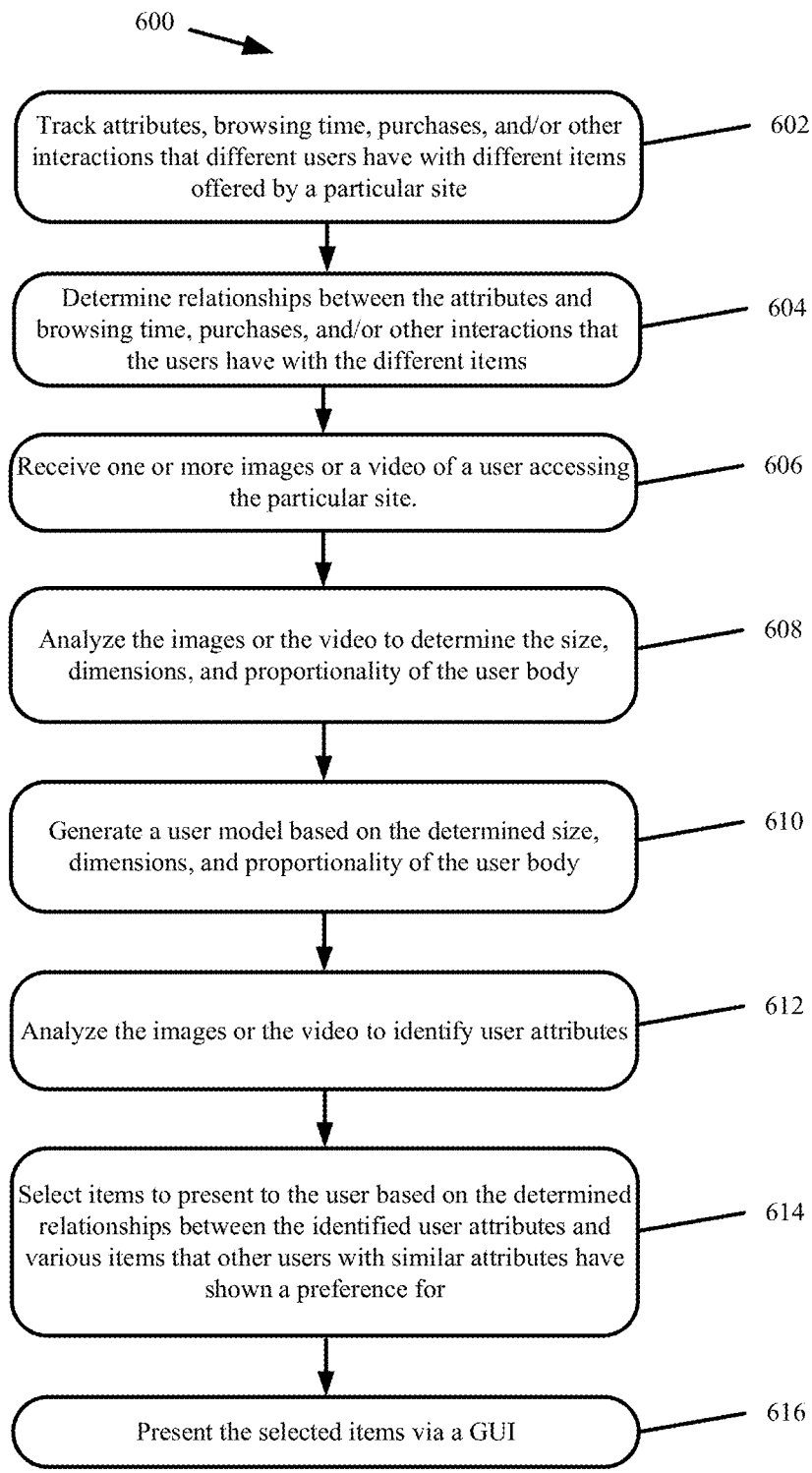
FIG. 6 presents a process for providing a virtual stylist that automatically selects items based on detected attributes from a user model in accordance with some embodiments presented herein.

FIG. 6 presents a process 600 for providing a virtual stylist that automatically selects items based on detected attributes from a user model in accordance with some embodiments presented herein. Process 600 may be implemented by VDRS 100 and/or the virtual stylist component of VDRS 100. In some embodiments, VDRS 100 may be integrated in devices that generate and/or provide access to an online commerce site. In some other embodiments, VDRS 100 may be implemented on a distributed device that provides the virtual dressing room and virtual stylist functionality for different online commerce sites.

Process 600 may include tracking (at 602) user attributes, browsing time, purchases, and/or other interactions that different users have with different items offered by a particular site. The attributes may correspond to body types, physical features, looks, and/or styles of the different users that VDRS 100 extracts from images of those user when generating the 3D user models for those users. The particular site may be an online retailer of clothing, clothing accessories, and/or other goods that may alter the appearance of a person. For instance, the particular site may sell jewelry, footwear, hats, eyewear, makeup, wearable electronics, purses, bags, body art, tattoos, body modifications, etc.

Process 600 may include determining (at 604) relationships between the attributes and browsing time, purchases, and/or other interactions that the users have with the different items. VDRS 100 may use pattern recognition, regression models, and/or AI/ML techniques to detect unique and/or differentiable commonality between user attributes and different item preferences. For instance, the AI/ML techniques may detect that wide-shouldered men prefer plaid-patterned shirts, that narrow-shouldered men prefer solid-colored shirts, that long-haired women prefer skirts, and that short-haired women prefer pants. The relationships may change over time as behavioral patterns of the different users change, and/or the looks of the users change over time (e.g., facial hair comes in and out of fashion). A relationship may be established when a threshold percentage (e.g., greater than 65%) of users with a particular set of attributes show a preference for a particular item, color, style, fit, brand, and/or other differentiating characteristics of the items, and/or when users with other attributes do not show the same preference for that particular item, color, style, fit, brand, and/or other differentiating characteristics.

In some embodiments, VDRS 100 may determine the relationships based on a set of rules. The merchant may create rules for preferences of persons with different attributes. For instance, the merchant may define a first rule that establishes a first relationship between men wearing glasses with circular lens and a first type of item, and may define a second rule that establishes a second relationship between women with a particular hairstyle and items from a particular manufacturer. In some such embodiments, VDRS 100 may update the relationships based on the tracking (at 602) of attributes, browsing time, purchases, and/or other interactions that different users have with different items.

Process 600 may include receiving (at 606) one or more images or a video of a user accessing the particular site. The user may access the particular site by directing a browser, application, AR/VR device, and/or other network-accessible device to a Uniform Resource Locator ("URL"), network address, and/or other identifier associated with the particular site. The one or more images or the video may show the user body from different sides (e.g., front, back, and sides).

Process 600 may include analyzing (at 608) the one or more images or the video to determine the size, dimensions, and proportionality of the user body. For instance, VDRS 100 may position the images in 3D space so as to determine the width, height, and length for various parts of the user body. Additionally, VDRS 100 may analyze (at 608) the images or the video to identify the points of reference at which to align different clothing items.

Process 600 may include generating (at 610) a user model based on the determined size, dimensions, and proportionality of the user body. The user model may include a 3D representation that matches the size, dimensions, and proportionality of the user body.

Process 600 may include analyzing (at 612) the one or more images or the video to identify user attributes. For instance, VDRS 100 may analyze (at 612) the images or the video to determine the user's skin tone, hairstyle, facial hair, facial features (e.g., eye size, eye coloring, nose shape, facial shape, cheek shape, chin shape, ear shape, etc.), body type (e.g., short, tall, thin, thick, broad-shouldered, narrow-shouldered, athletic build, etc.), arm size, thigh size, leg size, posture, and/or the style of clothing worn by the user. VDRS 100 may determine some of the user attributes from the user model and/or by comparing or measuring the distance or difference between first points of reference (e.g., shoulder distance) and second points of reference (e.g., waistline to neckline). VDRS 100 may determine other user attributes via object recognition (e.g., long beard, mustache, earrings, glasses, etc.), pattern matching (e.g., hairstyle matches a particular style), and/or image analysis (e.g., high cheekbones, skin tone, blue eyes, etc.).

Process 600 may include selecting (at 614) items to present to the user based on the determined (at 604) relationships between the identified user attributes and various items that other users with similar attributes have shown a preference for. As noted above, the relationships may be determined from users with similar attributes spending disproportionate browsing time on certain items, purchasing certain items with greater frequency, and/or other high rates of interactions by the users with the similar attributes with certain items.

Process 600 may include presenting (at 616) the selected items in a GUI. In some embodiments, VDRS 100 may present (at 616) the selected items by invoking the virtual dressing room functionality. Specifically, VDRS 100 may retrieve the item models for the selected items, and may apply the items models to the user model to illustrate the fit and styling of the selected items on the user model. In some other embodiments, VDRS 100 may present 2D images of the selected items, and the user may select which of the selected items to virtual try on using the virtual dressing functionality.

Figure 7:
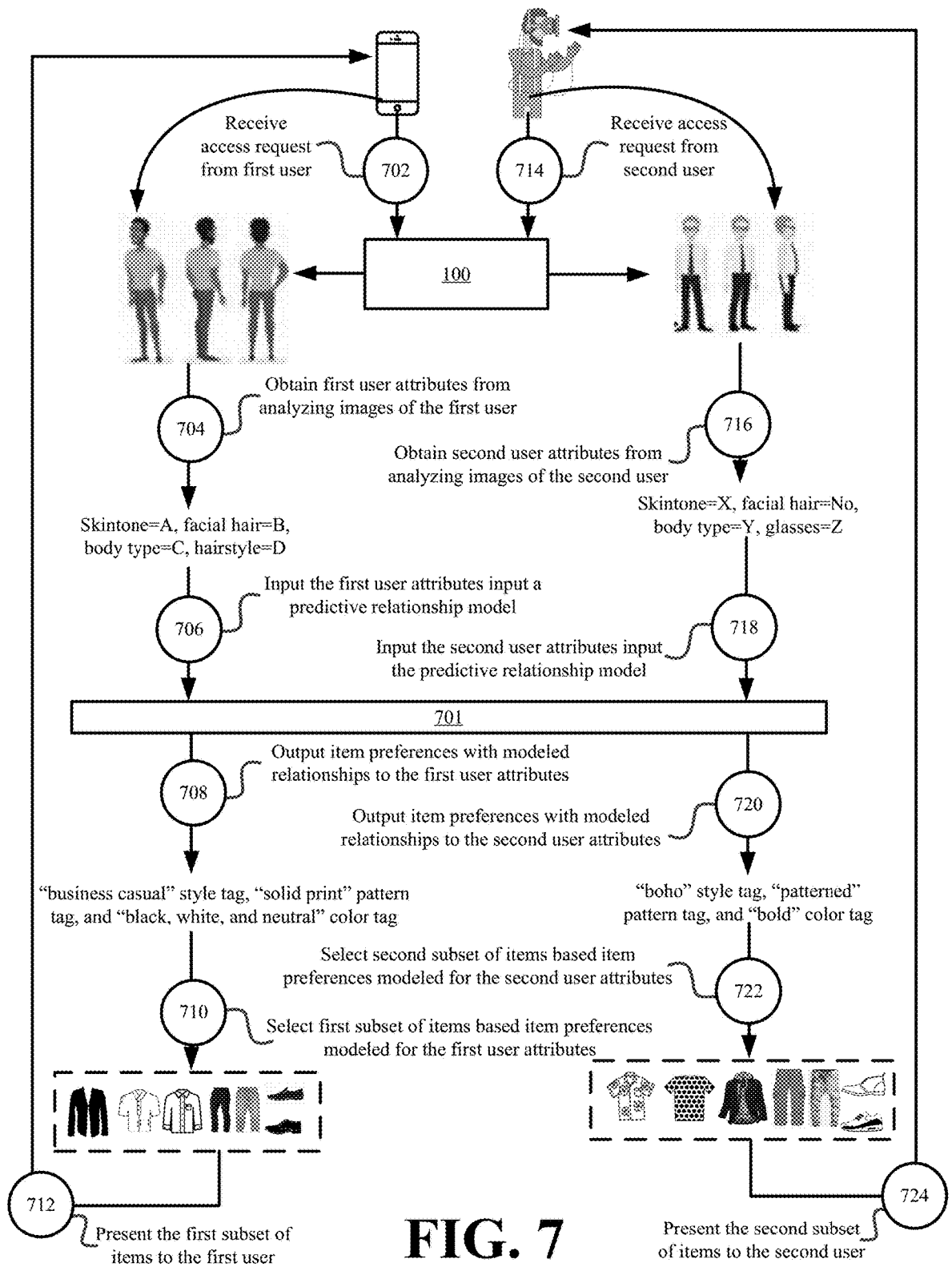
FIG. 7 illustrates example operation of the virtual stylist for different users in accordance with some embodiments presented herein.

FIG. 7 illustrates example operation of the virtual stylist for different users in accordance with some embodiments presented herein. VDRS 100 may detect a first user accessing a particular site. For instance, VDRS 100 may receive (at 702) one or more HyperText Transfer Protocol ("HTTP") messages that are sent from the device of the first user requesting a particular landing page of the particular site. In some embodiments, the messages may include images of the first user.

VDRS 100 may obtain (at 704) attributes of the first user. In some embodiments, VDRS 100 may obtain (at 704) the first user attributes by analyzing the images of the first user. In some other embodiments, VDRS 100 may receive login information from the first user, and may use the login information to retrieve a user model that was previously created for the first user and/or user attributes that were derived from previously uploaded images of the first user.

VDRS 100 may input (at 706) the obtained first user attributes into predictive model 701. Predictive model 701 may model the relationships between different user attributes and item preferences based on tracked activity of other users that have various attributes with different items.

Predictive model 701 may output (at 708) one or more item preferences based on the input first user attributes. The item preferences may include styles, fits, coloring, patterning, and/or other properties of items that other users with similar attributes as the first user attributes have frequently or commonly shown a preference for or selected. For instance, VDRS 100 may obtain first user attributes for the user's skin tone, facial hair, body type, and hairstyle (e.g., "dark", "groomed beard", "athletic", "crew cut", etc.) based on the analysis of images of the first user's face and body, and predictive model 701 may include relationships between those first user attributes and clothing items with the "business casual" style tag, "solid print" pattern tag, and "black, white, and neutral" color tags.

VDRS 100 may then select (at 710) a first subset of clothing items from the available inventory that include the associated style, pattern, and color tags for the item preferences associated with the first user attributes. VDRS 100 may present (at 712) the first subset of clothing items to the first user in a GUI or via the virtual dressing room.

As further shown in FIG. 7, VDRS 100 may receive (at 714) access request messages from a second user accessing the particular site. VDRS 100 may obtain (at 716) attributes of the second user from one or more images submitted with the access request messages or from a previously created user model for the second user.

VDRS 100 may input (at 718) the obtained second user attributes into predictive model 701. Predictive model 701 may output (at 720) one or more item preferences that have modeled relationships with the second user attributes. The item preferences that are associated with the second user attributes may be different than the item preferences that are associated with the first user attributes in predictive model 701. For instance, VDRS 100 may obtain second user attributes for the user's skin tone, facial hair, body type, and hairstyle (e.g., "light", "no facial hair", "slim", "square-lensed glasses", etc.) based on the analysis of images of the second user's face and body, and predictive model 701 may include relationships between those second user attributes and clothing items with the "boho" style tags, "patterned" pattern tags, and "bold" color tags.

VDRS 100 may select (at 722) a different second subset of clothing items from the available inventory that include the associated style, pattern, and color tags for the item preferences associated with the second user attributes. VDRS 100 may present (at 724) the second subset of clothing items to the second user in a GUI or via the virtual dressing room.

In some embodiments, VDRS 100 may provide the virtual stylist additional inputs besides the user attributes that may be extracted from analyzing images of the user. In some such embodiments, VDRS 100 may provide the virtual stylist with the user's purchase history, preferences input by the user, and/or tracked user activity. The virtual stylist may customize the selection of items for the user based on the user attribute-to-item preference association and the custom preferences within the supplemental data.

In some embodiments, VDRS 100 may provide inputs with which the user may customize the preferences used by the virtual stylist in selecting items for the user. For instance, the virtual stylist may derive the item preferences based on the user attributes, and may present interactive elements within the GUI of the virtual dressing room to present and change each item preference.

Figure 8:
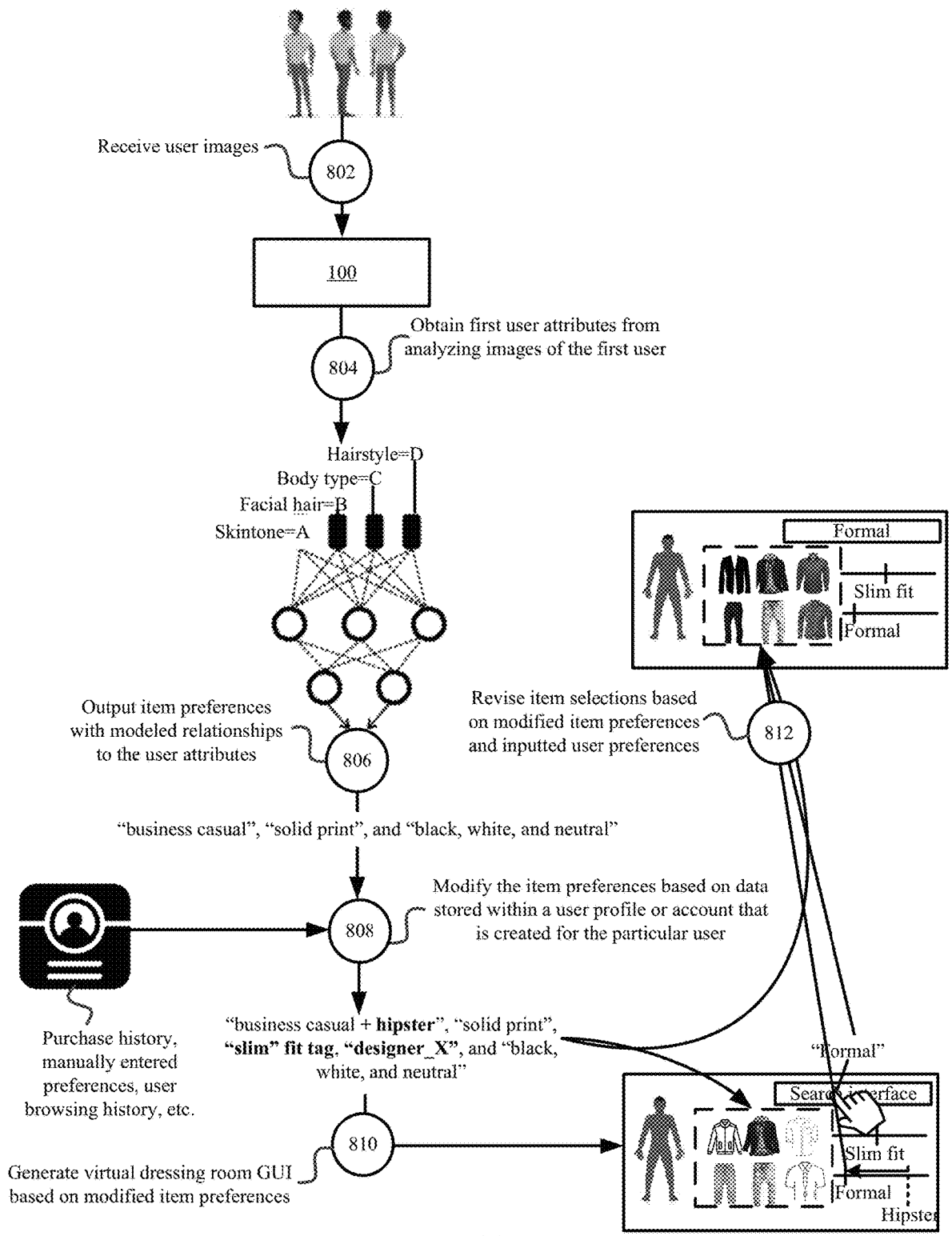
FIG. 8 illustrates an example of enhancing the selections made by the virtual stylist based on custom preferences of a user in accordance with some embodiments presented herein.

FIG. 8 illustrates an example of enhancing VDRS 100 and selections made by the virtual stylist based on custom preferences of a user in accordance with some embodiments presented herein. VDRS 100 may receive (at 802) images for a particular user, may obtain (at 804) user attributes from analyzing the images, and may identify (at 806) item preferences that are associated with the obtained user attributes based on an AI/ML modeling of different user attributes from other users to item preferences that VDRS 100 tracks for the other users.

VDRS 100 may modify (at 808) the item preferences based on data stored within a user profile or account that is created for the particular user. For instance, the user profile may track previous item purchases made by the particular user, may determine item preferences based on the purchase history, and may update the item preferences that are identified based on the user attributes with the item preferences that are identified in the purchase history. Additionally, the user profile may include item preferences that the particular user has specified via an questionnaire or other provided input.

VDRS 100 may generate (at 810) the virtual dressing room GUI to include the user model that is created based on the body type, size, dimensions, and/or proportions of the particular user. VDRS 100 may populate the virtual dressing room GUI with suggested items that the virtual stylist selects based on the modified item preferences from the image analysis and/or user profile. Additionally, VDRS 100 may provide selectable elements with which the particular user may dynamically adjust the item preferences or may provide additional selection criteria.

As shown in FIG. 8, the particular user may enter a preference for "formal" styled clothing using the selectable elements. VDRS 100 may revise (at 812) the item selections to include items with the "formal" style tag and that are preferred by other users with a similar body type and/or other user attributes as the particular user. For instance, the virtual stylist may present a slim fit suit and slim fit dress shirts with solid prints and neutral color in response to a request for "formal" styled clothing by a first user with a first body type and/or a first set of user attributes, and may present a classic fit pin-striped suit and patterned shirts in response to a request for "formal" styled clothing by a second user with a different second body type and/or a second set of user attributes.

Figure 9:
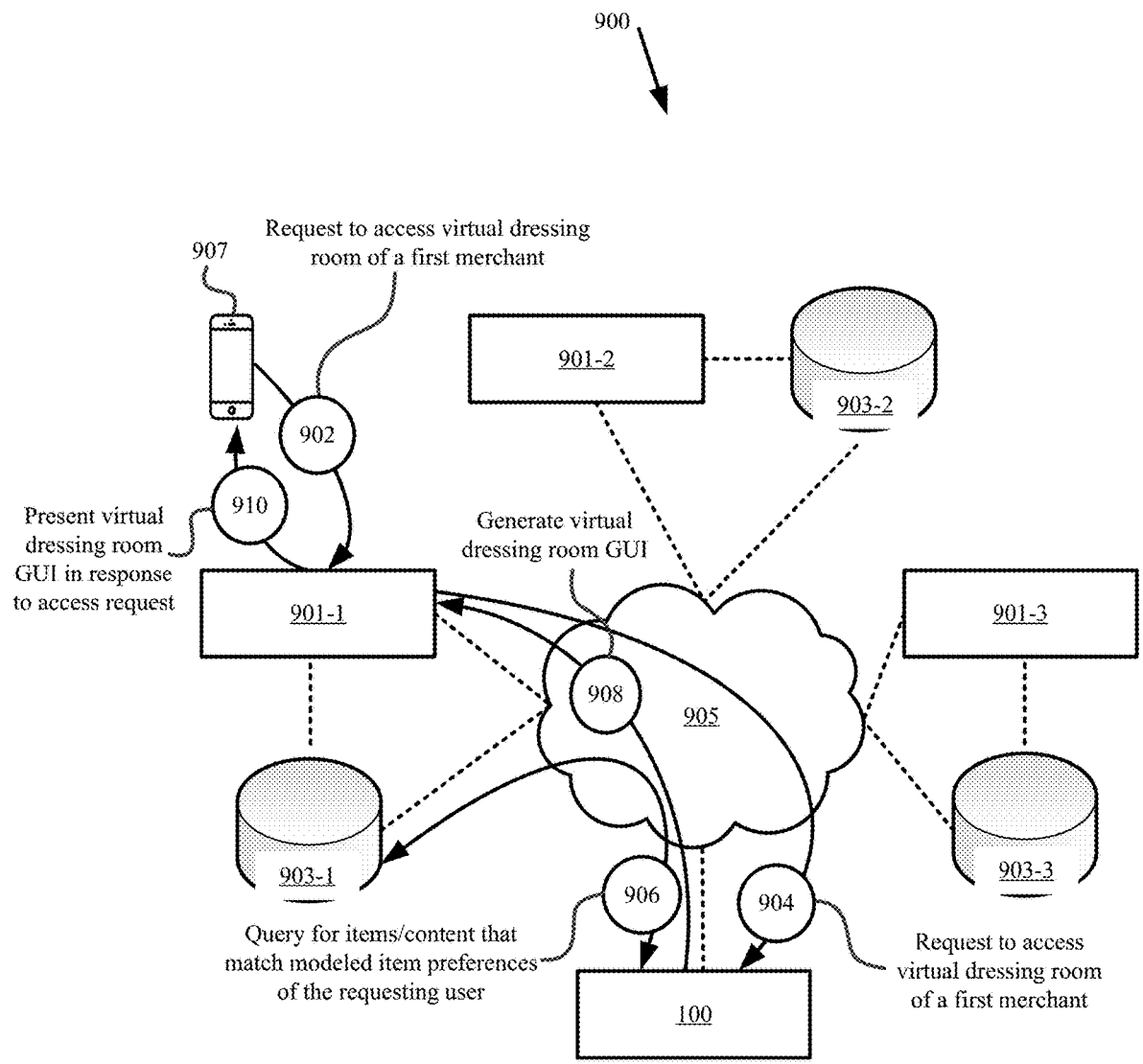
FIG. 9 illustrates an example architecture in accordance with some embodiments presented herein.

FIG. 9 illustrates an example architecture 900 for VDRS 100 in accordance with some embodiments presented herein. Architecture 900 may include VDRS 100, different devices or systems 901-1, 901-2, and 901-3 (referred to individually as "device or system 901" or in plural as "devices or systems 901") that host and provide access to different merchant sites, databases 903-1, 903-2, and 903-3 (referred to individually as "database 903" or in plural as "databases 903") of each device or system 901, and data network 905.

Devices or systems 901 may include web servers that distribute content from each merchant site to different requesting user devices. The user devices may include computers, smartphones, tablets, and/or network-accessible machines that different users use to access the merchant sites via data network.

Databases 903 may store the content and/or items that are offered for sale via the different merchant sites hosted by devices or systems 901. VDRS 100 may have access to databases 903, may generate custom content for each merchant site, and may provide the custom content to respective devices or systems 901 for presentation to the user devices.

For instance, user device 907 may issue a request to access the merchant site hosted by device or system 901-1. Device or system 901-1 may provide a landing page, login page, and/or other introductory content. The particular user device may issue (at 902) a request to access the virtual dressing room and/or virtual stylist functionality for that merchant site. The request may include images of the user controlling user device 907, or may include login information for accessing an account with a previously generated user model.

Device or system 901-1 may forward (at 904) the virtual dressing room request to VDRS 100. VDRS 100 may construct or retrieve the user model, may determine or retrieve the user attributes, and/or may map the user attributes to item preferences. VDRS 100 may identify database 903-1 that stores the content offered by device or system 901-1, may query (at 906) database 903-1 for content that matches the item preferences, may generate (at 908) the virtual dressing room GUI to include the user model and the matching content, and may provide the virtual dressing room GUI to device or system 901-1 for presentation (at 910) to user device 907.

Accordingly, VDRS 100 may include a distributed device that provides the virtual dressing room functionality and the virtual stylist functionality for different merchant sites (e.g., 901). In some embodiments, VDRS 100 may be integrated as part of device or system 901 of each merchant site, and may run locally on devices or systems 901 for faster operation and/or for independent control of VDRS 100.

Figure 10:
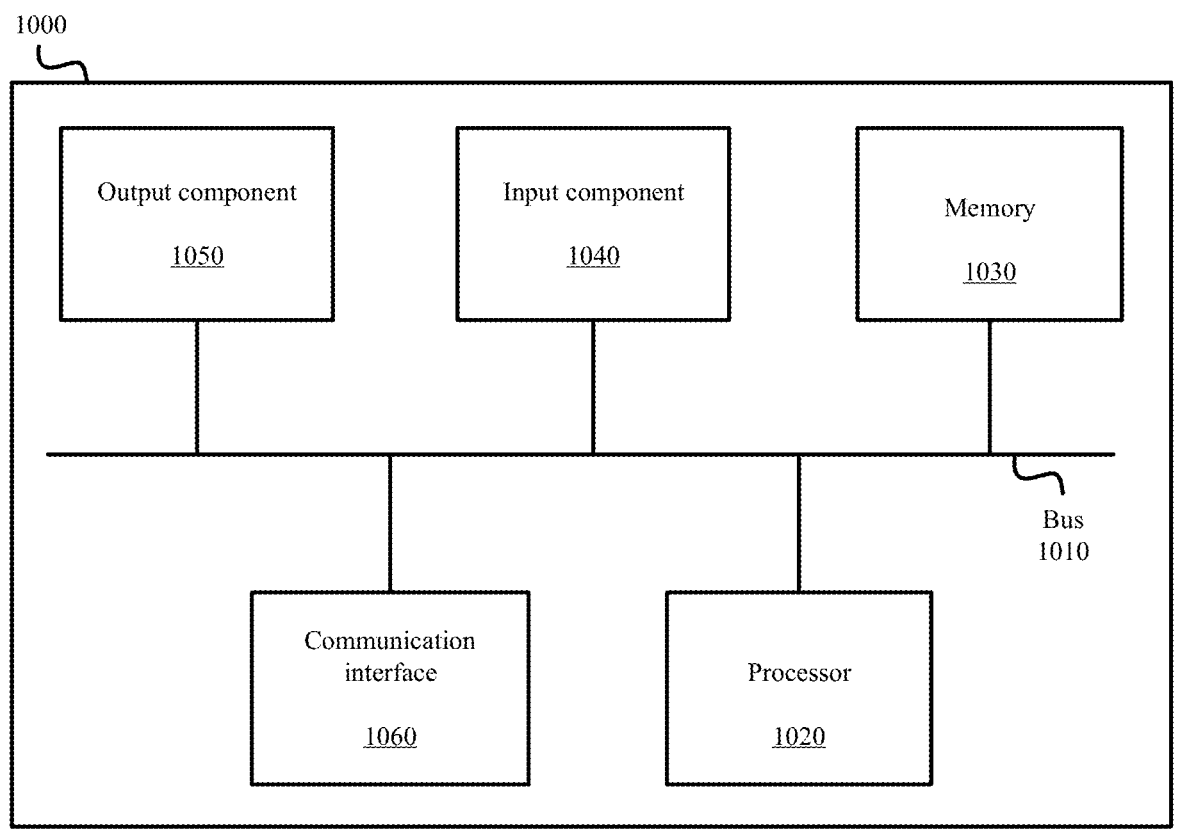
FIG. 10 illustrates example components of one or more devices, according to one or more embodiments described herein.

FIG. 10 is a diagram of example components of device 1000. Device 1000 may be used to implement one or more of the devices, systems, and/or GUIs described above (e.g., VDRS 100, the virtual dressing room of VDRS 100, the virtual stylist of VDRS 100, etc.). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device

1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving one or more images of a particular user over a data network;
   analyzing the one or more images;

determining a first set of user attributes in response to analyzing the one or more images;
inputting the first set of user attributes into a relationship model;
receiving a first set of item preferences as output from the relationship model;
selecting a set of items from a plurality of items based on the set of items comprising tags that satisfy the first set of item preferences;
generating a first site with the set of items; and
presenting the first site to the particular user over the data network.

2. The method of claim 1,
wherein determining the first set of user attributes comprises classifying a body type of the particular user based on an appearance of the particular user in the one or more images; and
wherein selecting the set of items comprises identifying a set of clothing that are fitted for the body type of the particular user.

3. The method of claim 1,
wherein determining the first set of user attributes comprises identifying a hair style of the particular user based on an appearance of the particular user in the one or more images; and
wherein selecting the set of items comprises identifying a set of clothing that contain a style attribute complementing or matching the hair style.

4. The method of claim 1,
wherein determining the first set of user attributes comprises defining a set of tags that classify facial features of the particular user; and
wherein selecting the set of items comprises identifying a set of clothing with one or more of a pattern, style, fit, or coloring that complement or match the set of tags.

5. The method of claim 1,
wherein determining the first set of user attributes comprises defining a set of tags that classify a size and shape of a body of the particular user appearing in the one or more images; and
wherein selecting the set of items comprises identifying a set of clothing with one or more of a pattern, style, fit, or coloring that complement or match the set of tags.

6. The method of claim 1 further comprising:
obtaining different sets of user attributes for different users browsing the plurality of items;
tracking interactions of the different users with the plurality of items; and
generating the relationship model based on users with common attributes interacting with similar items.

7. The method of claim 6, wherein receiving the first set of item preferences comprises:
detecting item preferences of a subset of the different users with similar attributes to the first set of user attributes of the particular user based on relationships between each set of user attributes and different items of the plurality of items.

8. The method of claim 6, wherein generating the relationship model comprises:
detecting a frequency with which users with the different sets of user attributes interact with each item of the plurality of items; and
defining a relationship within the relationship model in response to the frequency with which users with a particular set of user attributes interacting with a particular item is greater than a threshold.

9. The method of claim 1 further comprising:
measuring one or more of a size, shape, dimensions, and proportionality for a body of the particular user in response to analyzing the one or more images; and
generating a user model that represents one or more of the size, shape, dimensions, and proportionality for the body of the particular user.

10. The method of claim 9 further comprising:
receiving a selection of a particular item from the set of items presented with the first site;
retrieving an item model that represents one or more of a size, shape, dimensions, and proportionality of the particular item; and
presenting a fit and an appearance of the particular item relative to the body of the particular user by placing the item model onto the user model and presenting the one or more of the size, shape, dimensions, and proportionality of the particular item relative to the one or more of the size, shape, dimensions, and proportionality of the body of the particular user.

11. The method of claim 1 further comprising:
determining specific points of reference about a body of the particular user in response to analyzing the one or more images;
receiving a selection of a particular item from the set of items presented with the first site; and
generating a visualization that places the particular item onto the body of the particular user by aligning at least one specific point of reference of the particular item to at least one corresponding point of reference about the body of the particular user.

12. The method of claim 1,
wherein receiving the first set of item preferences comprises obtaining a set of tags that classify a style of the particular user; and
wherein selecting the set of items comprises filtering the plurality of items to retain one or more clothing items that match, accentuate, or complement the style of the particular user.

13. The method of claim 1, wherein the first set of user attributes comprises one or more of:
a detected hair style of the particular user,
facial hair detected on a face of the particular user,
eyewear worn by the particular user,
skin tone of the particular user, and
features related to one or more of eyes, nose, cheeks, chin, and ears of the particular user.

14. The method of claim 1 further comprising:
generating a user model based on a size and shape of a body of the particular user in the one or more images;
receiving a selection of a particular item from the set of items presented with the first site; and
generating a visualization that illustrates a size and fit of the particular item relative to the size and shape of the body of the particular user by placing an item model for a size and shape of the particular item onto the user model.

15. The method of claim 14 further comprising:
swapping the particular item with a same item in a different size or fit in response to user input provided after generating the visualization.

16. The method of claim 14 further comprising:
swapping the particular item with a different second item in response to the visualization presenting the particular item relative to the body of the particular user not satisfying a desired look of the particular user despite the particular item satisfying the first set of item preferences for items desired by the particular user.

17. The method of claim 14, wherein generating the visualization comprises:
presenting, within the first site, a first item model that represents the particular item in a first size relative to the user model;
receiving input that selects the particular item in a different second size; and
presenting, within the first site, a second item model that represents the particular item in the different second size relative to the user model.

18. The method of claim 1 further comprising:
generating an augmented reality or virtual reality presentation comprising an image of the particular user that is captured from a reflection of the particular user in a mirror, and that is modified to virtually illustrate a size and shape of a particular item from the set of items relative to a body of the particular user.

19. A system comprising:
one or more processors configured to:
receive one or more images of a particular user over a data network;
analyze the one or more images;
determine a first set of user attributes in response to analyzing the one or more images;
input the first set of user attributes into a relationship model;
receive a first set of item preferences as output from the relationship model;
select a set of items from a plurality of items based on the set of items comprising tags that satisfy the first set of item preferences;
generate a first site with the set of items; and
present the first site to the particular user over the data network.

20. A non-transitory computer-readable medium, storing a plurality of processor-executable instructions to:
receive one or more images of a particular user over a data network;
analyze the one or more images;
determine a first set of user attributes in response to analyzing the one or more images;
input the first set of user attributes into a relationship model;
receive a first set of item preferences as output from the relationship model;
select a set of items from a plurality of items based on the set of items comprising tags that satisfy the first set of item preferences;
generate a first site with the set of items; and
present the first site to the particular user over the data network.

* * * * *